(12) United States Patent
Gu et al.

(10) Patent No.: US 9,891,442 B2
(45) Date of Patent: Feb. 13, 2018

(54) VARIABLE CURVATURE DISPLAY DEVICE AND DISPLAYING METHOD THEREOF

(71) Applicant: SAMSUNG DISPLAY CO., LTD., Yongin, Gyeonggi-Do (KR)

(72) Inventors: Bon-Seog Gu, Seongnam-si (KR); Nam-Gon Choi, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 79 days.

(21) Appl. No.: 14/685,878

(22) Filed: Apr. 14, 2015

(65) Prior Publication Data

US 2016/0048031 A1    Feb. 18, 2016

(30) Foreign Application Priority Data

Aug. 12, 2014 (KR) .................. 10-2014-0104553

(51) Int. Cl.
| | |
|---|---|
| *G02B 27/22* | (2006.01) |
| *G06F 3/01* | (2006.01) |
| *G02F 1/1333* | (2006.01) |
| *G02B 27/00* | (2006.01) |
| *G09G 3/20* | (2006.01) |
| *G09G 5/00* | (2006.01) |
| *H04N 5/44* | (2011.01) |
| *H04N 5/64* | (2006.01) |
| *H04N 21/422* | (2011.01) |

(Continued)

(52) U.S. Cl.
CPC ..... *G02B 27/2271* (2013.01); *G02B 27/0093* (2013.01); *G02F 1/133305* (2013.01); *G06F 1/1652* (2013.01); *G06F 3/013* (2013.01); *G09G 3/20* (2013.01); *G09G 5/00* (2013.01); *H04N 5/44* (2013.01); *H04N 5/64* (2013.01); *H04N 21/42201* (2013.01); *H04N 21/44218* (2013.01); *G09G 2340/14* (2013.01); *G09G 2354/00* (2013.01); *G09G 2380/02* (2013.01)

(58) Field of Classification Search
CPC ............ G02B 27/2271; G02B 27/0093; G02B 1/133305; G06F 3/013; G06F 3/20; G09G 5/00; G09G 2340/14; G09G 2354/00
USPC ......................................................... 345/156
See application file for complete search history.

(56) References Cited

U.S. PATENT DOCUMENTS

| | | | | |
|---|---|---|---|---|
| 2012/0075166 A1* | 3/2012 | Marti | ...................... | G06F 3/011 345/1.1 |
| 2013/0114193 A1* | 5/2013 | Joo | ........................ | F16M 11/08 361/679.01 |

(Continued)

FOREIGN PATENT DOCUMENTS

| | | |
|---|---|---|
| JP | 6-016706 U | 3/1994 |
| JP | 2001-236023 A | 8/2001 |

(Continued)

*Primary Examiner* — Lisa Landis
(74) *Attorney, Agent, or Firm* — Lee & Morse, P.C.

(57) ABSTRACT

A display device includes a display panel displaying an image and having a first radius of curvature, a distance measuring unit measuring a user distance, the user distance being a distance between the display panel and a user, and a curvature radius changing unit receiving the measured user distance from the distance measuring unit, to change the first radius of curvature of the display panel to a second radius of curvature different from the first radius of curvature.

14 Claims, 9 Drawing Sheets

(51) Int. Cl.
*H04N 21/442* (2011.01)
*G06F 1/16* (2006.01)

(56) References Cited

U.S. PATENT DOCUMENTS

| | | | | |
|---|---|---|---|---|
| 2014/0063052 A1* | 3/2014 | Choi | ................ | G09G 5/377 |
| | | | | 345/629 |
| 2014/0118354 A1* | 5/2014 | Pais | ................ | G09G 5/373 |
| | | | | 345/428 |
| 2014/0225931 A1* | 8/2014 | Plagemann | ............... | G06T 3/40 |
| | | | | 345/660 |

FOREIGN PATENT DOCUMENTS

| | | |
|---|---|---|
| JP | 2006-324952 A | 11/2006 |
| JP | 2013-135448 A | 7/2013 |
| KR | 10-2013-0039008 A | 4/2013 |
| KR | 10-2014-0026927 A | 3/2014 |
| KR | 10-2015-0086728 A | 7/2015 |

* cited by examiner

VARIABLE CURVATURE DISPLAY DEVICE AND DISPLAYING METHOD THEREOF

CROSS-REFERENCE TO RELATED APPLICATION

Korean Patent Application No. 10-2014-0104553, filed on Aug. 12, 2014, in the Korean Intellectual Property Office, and entitled: "Display Device and Displaying Method Thereof," is incorporated by reference herein in its entirety.

BACKGROUND

1. Field

Embodiments relate to a display device and a displaying method thereof, and more particularly, to a display device and a displaying method thereof that enhance display quality.

2. Description of the Related Art

A flat panel display device is used for displaying an image on various information processing devices, such as a TV, a monitor, a notebook, and a portable computer. Recently, a display device having a curved shape is being developed, and the display device having the curved shape may provide a display region having a curved shape to provide a user with an image which has been enhanced in 3D effect, absorption and presence.

SUMMARY

Embodiments provide a display device having an enhanced display quality.

Embodiments also provide a displaying method of a display device having an enhanced display quality.

Embodiments provide display devices including a display panel displaying an image and having a first radius of curvature, a distance measuring unit measuring a user distance, the user distance being a distance between the display panel and a user, and a curvature radius changing unit receiving the measured user distance from the distance measuring unit, to change the first radius of curvature of the display panel to a second radius of curvature different from the first radius of curvature.

In some embodiments, a reference distance corresponding to the first radius of curvature may be set, and when the user distance is shorter than the reference distance, the curvature radius changing unit may set the second radius of curvature to be smaller than the first radius of curvature.

In other embodiments, a reference distance corresponding to the first radius of curvature may be set, and when the user distance is shorter than the reference distance, the curvature radius changing unit may set the second radius of curvature to be larger than the first radius of curvature.

In still other embodiments, the user distance may be a shortest distance from a point on the distance measuring unit to a point between a left eye of the user and a right eye of the user.

In even other embodiments, the user distance may be a distance between a user closest to the display panel among users and the display panel when there is a plurality of users.

In yet other embodiments, the user distance may be an average of distances between the display panel and users when there is a plurality of users.

In further embodiments, the user distance may be a median of distances between the display panel and users when there is a plurality of users.

In still further embodiments, the display devices may further include: a remote controller remotely adjusting the display panel; and an adjustment signal receiving unit receiving an adjustment signal from the remote controller.

In even further embodiments, the distance measuring unit may include the adjustment signal receiving unit.

In yet further embodiments, the distance measuring unit may include at least one of a camera, an infrared sensor, an ultraviolet sensor and a laser sensor.

In much further embodiments, the display panel may include a display area displaying an image and a non-display area not displaying an image and the distance measuring unit overlaps with the non-display area.

In still much further embodiments, the display panel may further have a third radius of curvature different from the first radius of curvature.

In other embodiments, displaying methods of a display device include: measuring a user distance between a display panel having a first radius of curvature and a user; and receiving measured distance data and changing the first radius of curvature of the display panel to a second radius of curvature different from the first radius of curvature.

In some embodiments, the displaying methods may further include setting a reference distance corresponding to the first radius of curvature.

In other embodiments, the changing of the first radius of curvature may include setting the second radius of curvature to be smaller than the first radius of curvature when the user distance is shorter than the reference distance.

In still other embodiments, the changing of the first radius of curvature may include setting the second radius of curvature to be larger than the first radius of curvature when the user distance is longer than the reference distance.

In even other embodiments, the measuring of the user distance may include measuring a shortest distance from a point on the distance measuring unit to a point between a left eye of the user and a right eye of the user.

In yet other embodiments, the measuring of the user distance may include measuring a distance between a user closest to the display panel among users and the display panel when there is a plurality of users.

In further embodiments, the measuring of the user distance may include measuring an average of distances between the display panel and the users when there is a plurality of users.

In still further embodiments, the measuring of the user distance may include measuring a median of distances between the display panel and the users when there is a plurality of users.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
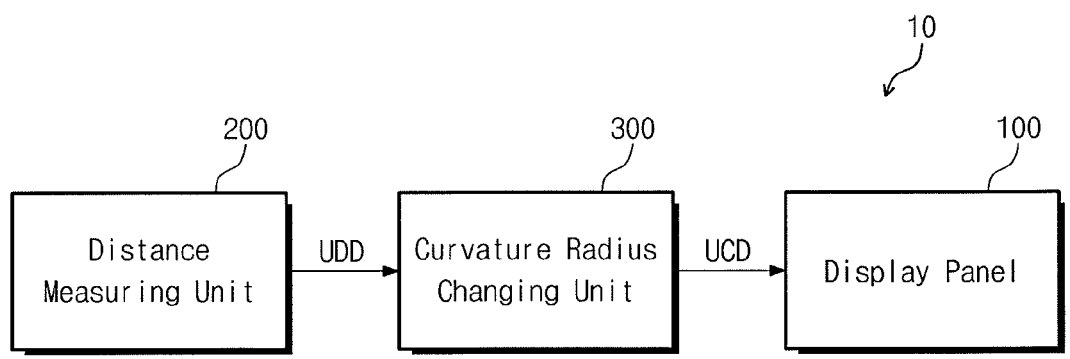
FIG. 1 illustrates a schematic block diagram of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, although the terms a 'first' and a 'second' may be used to describe various components, these components should not be limited by these terms. The terms are used only in order to distinguish a component from another component. For example, without departing from the scope of embodiments, a first component may be called a second component and similarly, the second component may also be called the first component. The terms in singular form include the plural form unless otherwise specified.

In the present application, it should be understood that the terms "includes" or "has" indicate the presence of characteristics, numbers, steps, operations, components, parts or combinations thereof represented in the present disclosure but do not exclude the presence or addition of one or more other characteristics, numbers, steps, operations, components, parts or combinations thereof.

Figure 2:
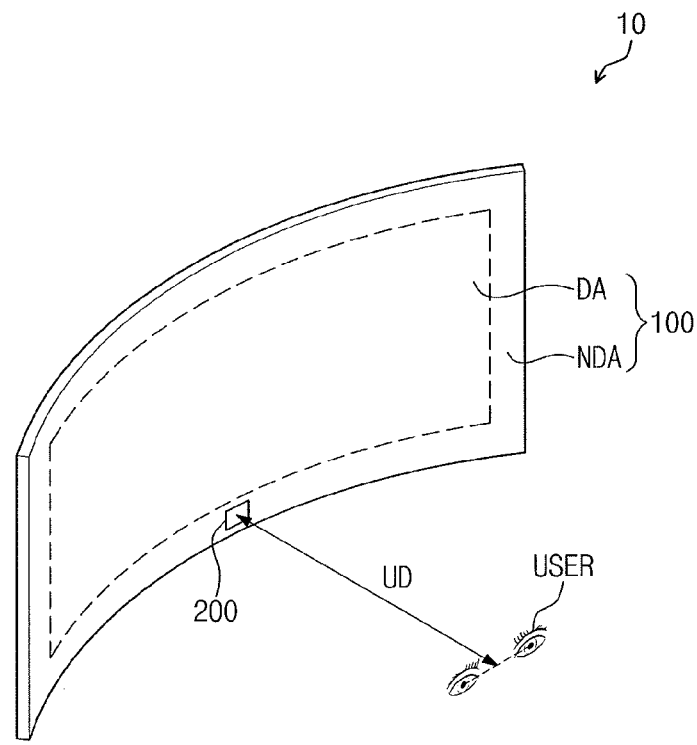
FIG. 2 illustrates a schematic perspective view of a display device according to an embodiment.

FIG. 1 is a schematic block diagram of a display device according to an embodiment. FIG. 2 is a schematic perspective view of a display device according to an embodiment.

Referring to FIGS. 1 and 2, a display device 10 according to an embodiment may include a display panel 100, a distance measuring unit 200, and a curvature radius changing unit 300.

The display panel 100 may be any suitable display panel, e.g., an organic light emitting display panel, a liquid crystal display panel, a plasma display panel, an electrophoretic display panel, and an electro-wetting display panel. The display panel 100 may be rigid or flexible. The display panel 100 may include a display area DA displaying an image, and a non-display area NDA not displaying an image. For example, the non-display area NDA may surround the display area DA. The display area DA may be roughly rectangular but embodiments are not limited thereto.

Figure 3A:
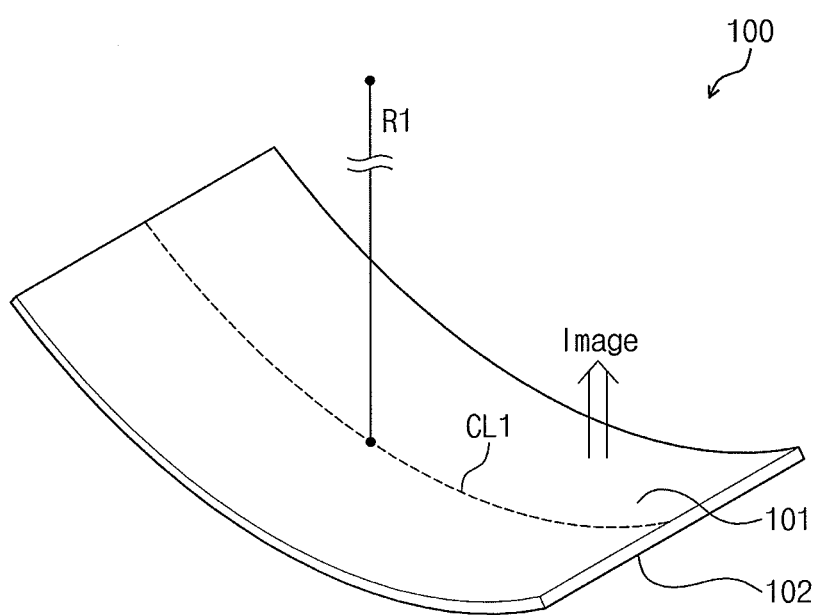
FIG. 3A illustrates a schematic perspective view of a display panel in a display device according to an embodiment.

FIG. 3A is a schematic perspective view of a display panel in a display device according to an embodiment.

Referring to FIG. 3A, the display panel 100 displays an image and has a first radius of curvature R1. The display panel 100 may include a curved display surface 101, at least a portion of which displays an image, and a rear surface 102 facing the curved display surface 101.

The curved display surface 101 may be a simply curved surface that has a curvature only in one direction. However, embodiments are not limited thereto, e.g., the curved display surface 101 may be a doubly curved surface having a plurality of curvatures in a plurality of directions.

The rear surface 102 may be a simple, curved surface that has a curvature only in one direction. However, embodiments are not limited thereto, e.g., the rear surface 102 may also be a double, curved surface having a plurality of curvatures in a plurality of directions.

The display panel 100 may have a first radius of curvature R1. For example, when the display panel 100 is seen from a user USER location (FIG. 2), the curved display surface 101 may have the first radius of curvature R1 when the display panel 100 is concavely curved. The first radius of curvature R1 of the curved display surface 101 is a value corresponding to a radius of a circular arc including the curved display surface 101, i.e., a radius of a circle including a circular arc CL1. Further, when the display panel 100 is seen from a user USER (in FIG. 2) location, the rear surface 102 may have the first radius of curvature R1 when the display panel 100 is convexly curved.

Figure 3B:
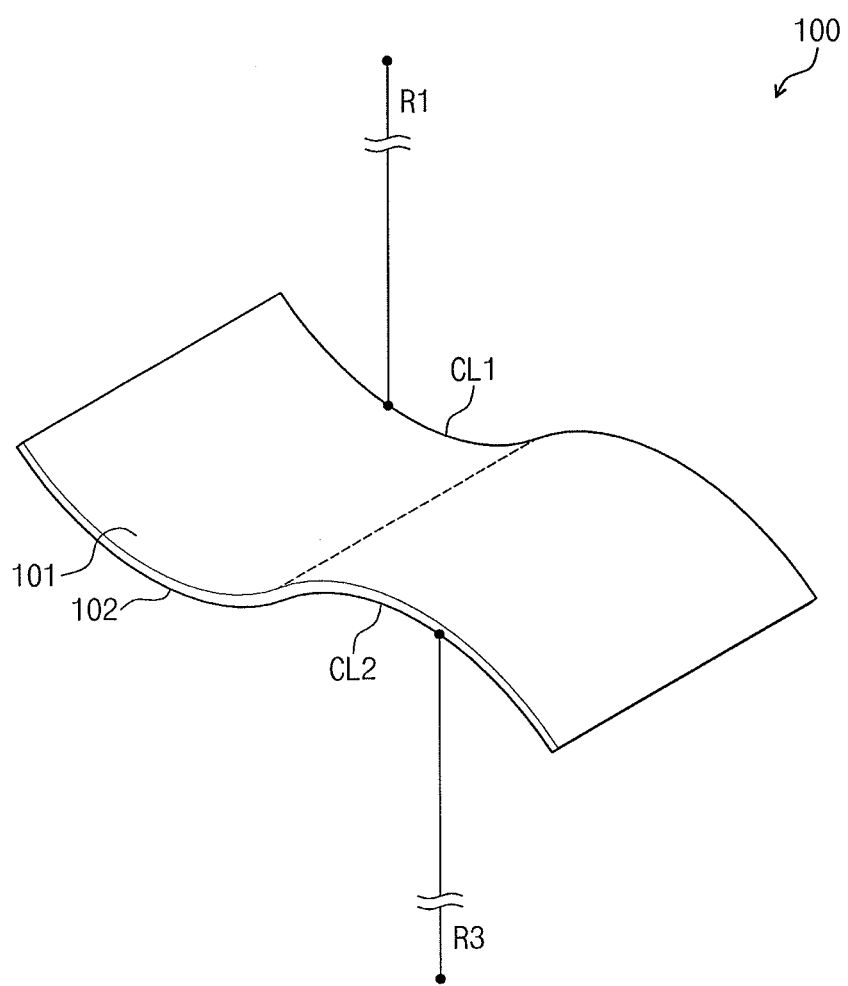
FIG. 3B illustrates a schematic perspective view of a display panel in a display device according to an embodiment.

FIG. 3B is a schematic perspective view of a display panel in a display device according to an embodiment.

Referring to FIG. 3B, the display panel 100 may have a plurality of curvatures. For example, in addition to the first radius of curvature R1, the display panel 100 may further have a third radius of curvature R3 different from the first radius of curvature R1. For example, when the display panel 100 is seen from a user USER location (same as in FIG. 2), the curved display surface 101 may have the first radius of curvature R1 and the rear surface 102 may have the third radius of curvature R3 when the display panel 100 is concavely curved. The first radius of curvature R1 may be a value corresponding to the radius of a circular arc when a side CL1 on the curved display surface 101 is considered as the circular arc. The third radius of curvature R3 may be a value corresponding to the radius of a circular arc when a side CL2 on the rear surface 102 is considered as the circular arc.

Referring to FIGS. 1 to 3A, the first radius of curvature R1 may be, e.g., about 3000 mm to about 5000 mm when the display panel 100 is a liquid crystal display panel. When the first radius of curvature R1 is smaller than about 3000 mm, it is difficult for a user to effectively recognize a displayed image, and when the first radius of curvature R1 is larger than about 5000 mm, the user USER may experience a decrease in 3D effect, absorption and presence on an image displayed by the display device 10. When the display panel 100 is a liquid crystal display panel, the display device 10 may be used for a TV.

When the display panel 100 is an organic light emitting display panel, the first radius of curvature R1 may be about 3 mm to about 5 mm, for example. When the first radius of curvature R1 is smaller than about 3 mm, it is difficult for the user USER to effectively recognize a displayed image, and when the first radius of curvature R1 is larger than about 5 mm, the user USER may experience a decrease in 3D effect, absorption and presence on an image displayed by the display device 10. When the display panel 100 is the organic light emitting display panel 100, the display device 10 may be used for a portable phone or a tablet.

Referring to FIG. 2, the distance measuring unit 200 measures a user's distance UD that is the distance between the display panel 100 and the user USER. The distance measuring unit 200 provides the curvature radius changing unit 300 with user distance data UDD. As illustrated in FIG. 2, the distance measuring unit 200 may be arranged under the display area DA of the display panel 100, e.g., the distance measuring unit 200 may be arranged in a center of the non-display area NDA underneath the display area DA. However, embodiments are not limited thereto, e.g., the distance measuring unit 200 may be arranged on or next to the display area DA of the display panel 100 or may be arranged on a side surface of the display panel 100.

For example, the distance measuring unit 200 may overlap with the non-display area NDA, e.g., the distance measuring unit 200 may be in the non-display area NDA. However, embodiments are not limited thereto, e.g., the distance measuring unit 200 may overlap with the display area DA as discussed previously. The distance measuring unit 200 may also be arranged on the display panel 100, and at least a portion of the distance measuring unit 200 may also be mounted on the display panel 100.

The distance measuring unit 200 may include anything that may measure the user distance UD between the display panel 100 and the user USER, e.g., the distance measuring unit 200 may include at least one of a camera, an infrared sensor, an ultraviolet sensor, and a laser sensor, without any limitation. For example, the camera may be a charge coupled device (CCD) camera or a complementary metal oxide semiconductor (CMOS) camera. The user distance UD measured by the distance measuring unit 200 may be defined in various forms and may be the shortest distance from one point on the distance measuring unit 200 to a point between the left eye and right eye of the user USER, for example.

Figure 4:
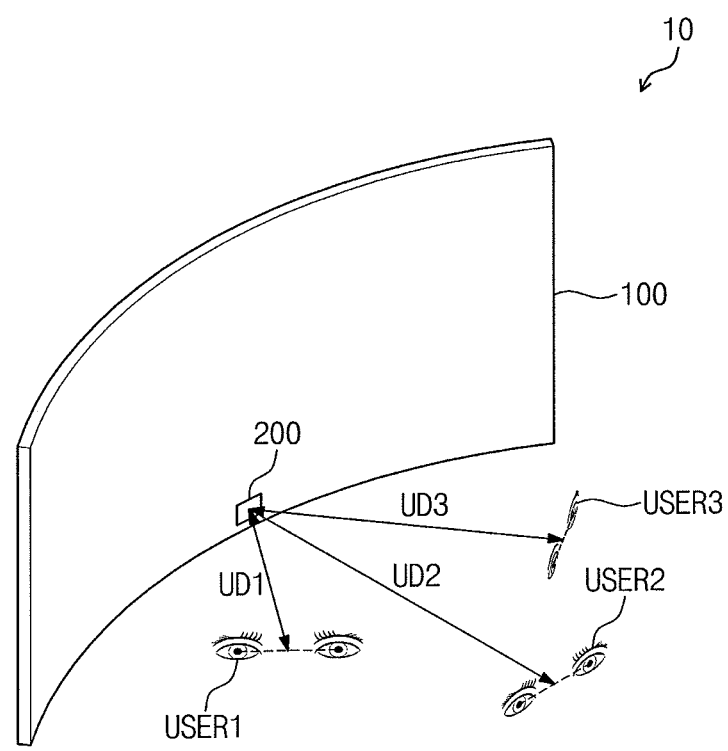
FIG. 4 illustrates a schematic perspective view of a display device according to an embodiment when there is a plurality of users.

FIG. 4 is a schematic perspective view of the display device 10 according to an embodiment when there is a plurality of users. That is, since the user USER that recognizes an image on the display device 10 may include a plurality of users, FIG. 4 shows an example in which a first user USER1, a second user USER2, and a third user USER3 recognize an image.

Referring to FIG. 4, the first user USER1 is spaced at a first user distance UD1 apart from the distance measuring unit 200 and recognizes an image. The second user USER2 is spaced at a second user distance UD2 apart from the distance measuring unit 200 and recognizes an image. The third user USER3 is spaced at a third user distance UD3 apart from the distance measuring unit 200 and recognizes an image. The first user distance UD1 is shorter than each of the second user distance UD2 and the third user distance UD3, and the third user distance UD3 is shorter than the second user distance UD2. That is, when the user distances are enumerated in ascending order from the first user distance UD1, they are arranged in the following sequence: the first user distance UD1, the third user distance UD3, and the second user distance UD2.

For example, when there is a plurality of users, the user distance may be determined as being a shortest distance between the display panel 100 and a user closest to the display panel 100 among the users. For example, since the user closest to the display panel 100 among the plurality of users in FIG. 4 is the first user USER1, the first user distance may be set as the first user distance UD1 between the display panel 100 and the first user USER1.

In another example, when there is a plurality of users, the user distance may be determined as an average of the distances between the display panel 100 and the users. For example, the user distance may be an average of the first user distance UD1, the second user distance UD2, and the third user distance UD3.

In yet another example, when there is a plurality of users, the user distance may be determined as a median of the distances between the display panel 100 and the users. For example, since a median of the distances between the display panel 100 and the users is the second user distance UD2, the user distance may be set as the second user distance UD2.

Referring to FIGS. 1 and 4, the curvature radius changing unit 300 receives the data UDD regarding the user distance UD measured by the distance measuring unit 200. It is noted that when there is a single user, as discussed previously with reference to FIGS. 2-3B, the data UDD and user distance UD in FIG. 1 refer to the distance of the single user USER from the display panel 100. However, when there are multiple users, as discussed with reference to FIG. 4, the data UDD and user distance UD in FIG. 1 may refer to, e.g., the distance of the closest user, the average distance of the users, or the median distance of the users.

Once the curvature radius changing unit 300 receives the data UDD regarding the user distance UD, the curvature radius changing unit 300 provides the display panel 100 with a curvature radius change signal UCD in accordance with the data UDD, and changes the first radius of curvature R1 of the display panel 100 to a second radius of curvature R2 (in FIGS. 5 and 6) different from the first radius of curvature R1.

The curvature radius changing unit 300 may overlap with the non-display area NDA. However, embodiments are not limited thereto, e.g., the curvature radius changing unit 300 may also overlap with the display area DA. The curvature radius changing unit 300 may also be arranged on the display panel 100, and at least a portion of the curvature radius changing unit 300 may be mounted on the display panel 100.

Figure 5:
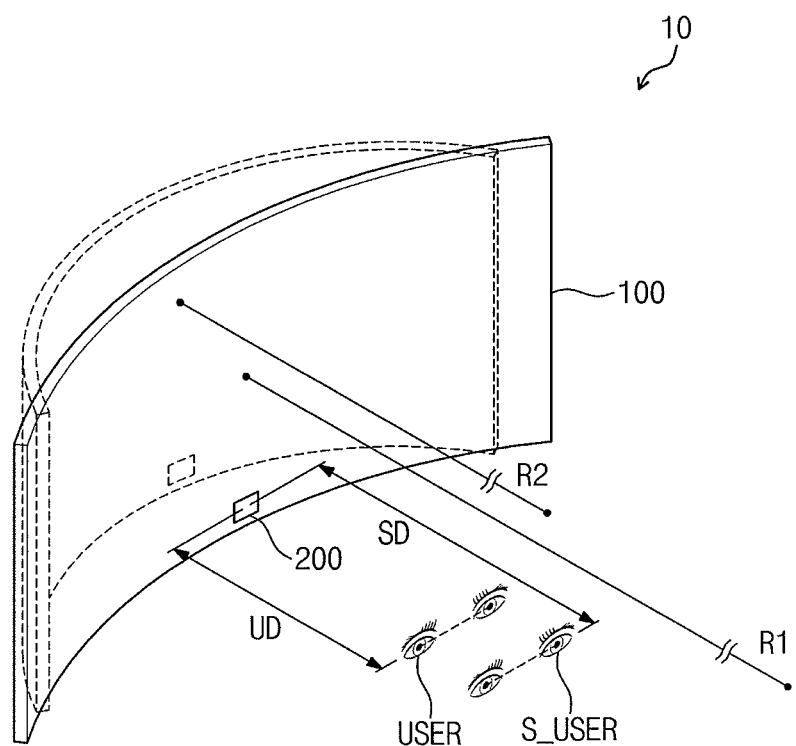
FIG. 5 illustrates a schematic perspective view of a change in radius of curvature of a display device according to an embodiment when a user distance is shorter than a reference distance.
Figure 6:
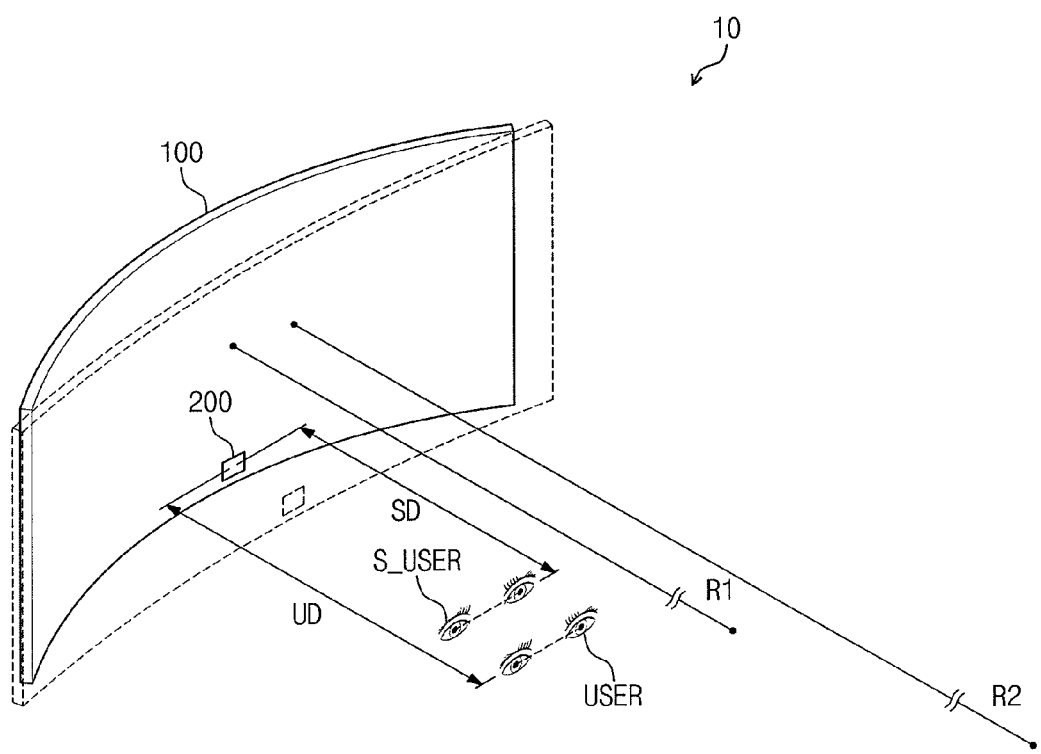
FIG. 6 illustrates a schematic perspective view of a change in radius of curvature of a display device according to an embodiment when a user distance is longer than a reference distance.

FIG. 5 is a schematic perspective view of a change in radius of curvature of the display device 10 according to an embodiment when the user distance UD is shorter than a reference distance SD. FIG. 6 is a schematic perspective view of a change in radius of curvature of the display device 10 according to an embodiment when the user distance UD is longer than the reference distance SD.

Referring to FIGS. 5 and 6, the reference distance SD corresponding to the first radius of curvature R1 is set for the display device 10 according to an embodiment. The reference distance SD may be a preset value.

The reference distance SD may be defined in any suitable form. For example, the reference distance SD in FIGS. 5-6 is defined as a distance between the display panel 100 and the user USER, when the user USER recognizes an image. FIGS. 5 and 6 show a reference user S_USER as a user recognizing an image spaced at the reference distance SD apart from the display panel 100.

Referring to FIGS. 1 and 5, when the user distance UD is shorter than the reference distance SD, the curvature radius changing unit 300 sets the second radius of curvature R2 to be smaller than the first radius of curvature R1 in order to enable the user USER to experience enhancement in 3D effect, absorption and presence. Thus, the radius of curvature of the display panel 100 changes from the first radius of curvature R1 (radius referring to the display panel 100 illustrated with a solid line in FIG. 5) to the second radius of curvature R2 (radius referring to the display panel illustrated with a dashed line in FIG. 5) smaller than the first radius of curvature R1. When the display panel 100 is seen from the reference distance SD, the display panel 100 may become more concave, i.e., more bulging away from the user, as the user distance UD decreases relatively to the reference distance SD.

Referring to FIGS. 1 and 6, when the user distance UD is longer than the reference distance SD, the curvature radius changing unit 300 sets the second radius of curvature R2 to be larger than the first radius of curvature R1 in order to enable the user USER to experience enhancement in 3D effect, absorption and presence. Thus, the radius of curvature of the display panel 100 changes from the first radius of curvature R1 (radius referring to the display panel 100 illustrated with a solid line in FIG. 6) to the second radius of curvature R2 (radius referring to the display panel illustrated with a dashed line in FIG. 6) larger than the first radius of curvature R1. When the display panel 100 is seen from the reference distance SD, the display panel 100 may become more convex, i.e., more bulging toward the user, as the user distance UD increases relatively to the reference distance SD.

Referring back to FIGS. 1 to 4, when the location of the user USER moves to the left or right, the radius of curvature of the display panel 100 may change so that the location of the user USER may be close to the center of the display panel 100. Thus, when the user USER recognizes an image, the user USER may experience enhancement in 3D effect, absorption and presence.

Figure 7:
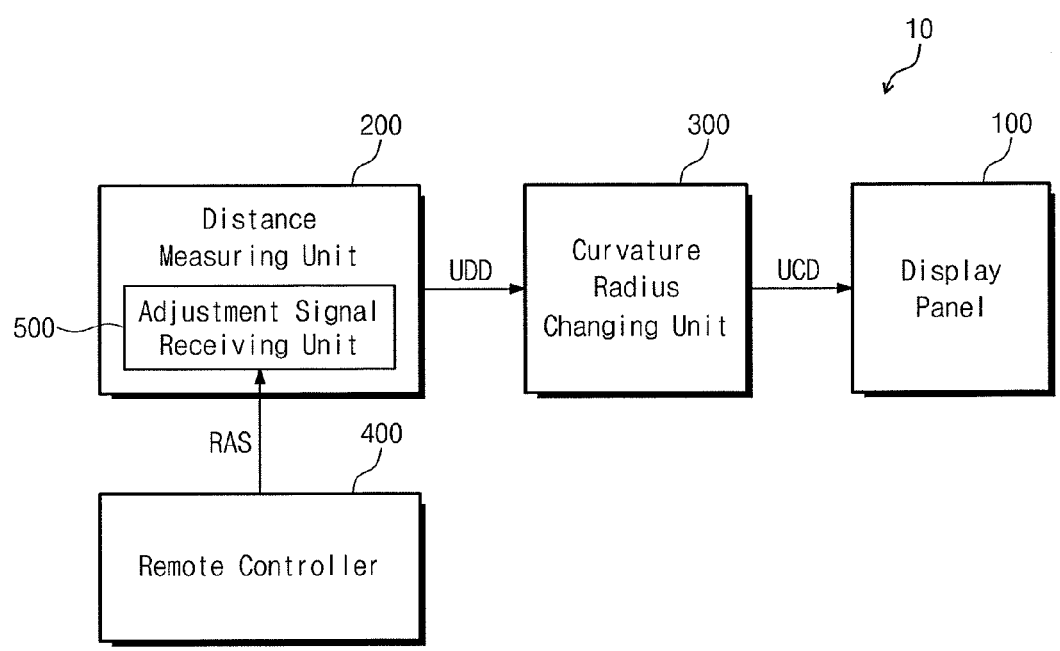
FIG. 7 illustrates a schematic block diagram of a display device according to an embodiment.
Figure 8:
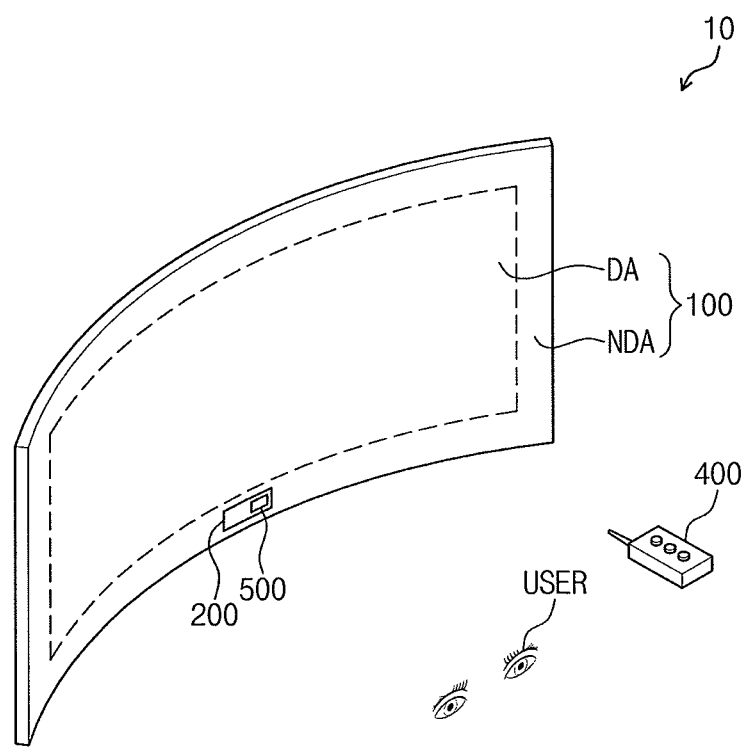
FIG. 8 illustrates a schematic perspective view of a display device according to an embodiment.

FIG. 7 is a schematic block diagram of the display device 10 according to an embodiment. FIG. 8 is a schematic block diagram of the display device 10 according to an embodiment.

Referring to FIGS. 7 and 8, the display device 10 according to an embodiment may further include a remote controller 400 and an adjustment signal receiving unit 500.

The remote controller 400 may remotely adjust the display panel 100. For example, the user USER may adjust, e.g., the brightness and luminescence of an image displayed on the display panel 100 with the remote controller 400.

The adjustment signal receiving unit 500 may receive an adjustment signal RAS from the remote controller 400. For example, the adjustment signal RAS may include a brightness adjustment signal or a luminescence adjustment signal.

The distance measuring unit 200 may include the adjustment signal receiving unit 500. The distance measuring unit 200 may measure the user distance UD between the display panel 100 and the user USER, and may receive the adjustment signal RAS from the remote controller 400.

As mentioned above, the distance measuring unit 200 provides the data UDD regarding the user distance UD to the curvature radius changing unit 300. The curvature radius changing unit 300 receives the data UDD, provides the display panel 100 with the curvature radius change signal UCD in accordance with the data UDD, and changes the first radius of curvature R1 of the display panel 100 to the second radius of curvature R2 different from the first radius of curvature R1.

In a typical display device, it has been difficult to change a radius of curvature according to the location of a user. Thus, a user recognizing an image in the typical display device has experienced a decrease in 3D effect, absorption and presence according to the location of the user.

In contrast, the display device according to an embodiment, may change, e.g., adjust, the radius of curvature of the display panel according to the location of a user. Therefore, the user recognizing an image may experience enhancement in 3D effect, absorption and presence according to the location of the user.

Figure 9:
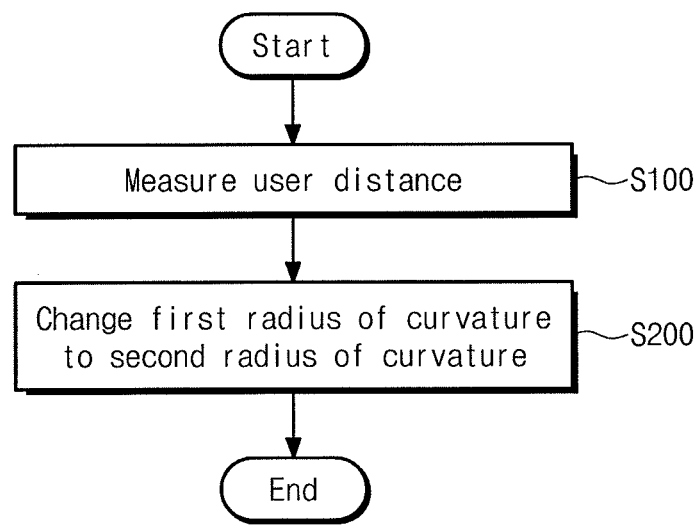
FIG. 9 illustrates a schematic flow chart of a displaying method of a display device according to an embodiment.

In the following, a displaying method of the display device 10 according to an embodiment is described with reference to FIG. 9. In the following embodiment, features of the display device 10 that are different from those described in FIGS. 1-8 are mainly provided. FIG. 9 is a schematic flow chart of a displaying method of the display device 10 according to an embodiment.

Referring to FIGS. 1 to 3A and 9, the displaying method of the display device 10 according to an embodiment may include measuring the user distance UD between the display panel 100 having the first radius of curvature R1 and the user USER (operation S100), and changing the first radius of curvature R1 of the display panel 100 to the second radius of curvature R2 in accordance with the measured distance in operation S100 (operation S200). Changing of the first radius of curvature R1 into the second radius of curvature R2 is done in response to receipt of the distance data UDD measured in operation S100.

In detail, the user distance UD between the display panel 100 having the first radius of curvature R1 and the user USER is measured in operation S100. The display panel 100 displays an image and has the first radius of curvature R1 (in FIGS. 5 and 6).

The user distance UD between the display panel 100 and the user USER may be measured by the distance measuring unit 200, for example. The distance measuring unit 200 may include at least one of, e.g., a camera, an infrared sensor, an ultraviolet sensor and a laser sensor. For example, the camera may be a charge coupled device (CCD) camera or complementary metal oxide semiconductor (CMOS) camera.

In operation S100 of measuring the user distance UD, the user distance UD may be defined as various forms and may be the shortest distance from one point on the distance measuring unit 200 to a point between the left eye and right eye of the user USER, for example.

The user that recognizes an image on the display device 10 according to an embodiment may be a single user or a plurality of users. FIG. 4 shows an example in which the first user USER1, the second user USER2, and the third user USER3 recognize an image. The first user USER1 is spaced at the first user distance UD1 apart from the distance measuring unit 200 and recognizes an image. The second user USER2 is spaced at the second user distance UD2 apart from the distance measuring unit 200 and recognizes an image. The third user USER3 is spaced at the third user distance UD3 apart from the distance measuring unit 200 and recognizes an image. The first user distance UD1 is shorter than each of the second user distance UD2 and the third user distance UD3, and the third user distance UD3 is shorter than the second user distance UD2. That is, when the user distances are enumerated in ascending order, they are in a sequence of the first user distance UD1, the third user distance UD3, and the second user distance UD2.

Referring to FIGS. 4 to 9, when there is a plurality of users USERs, operation S100 of measuring the user distance UD may include measuring the distance between the display panel 100 and a user closest to the display panel 100 among the users. For example, since the user closest to the display panel 100 among the users is the first user USER1, operation S100 of measuring the user distance UD may include measuring the first user distance UD1.

When there is a plurality of users, operation S100 of measuring the user distance UD may include measuring the average of the distances between the display panel 100 and the users. For example, operation S100 of measuring the user distance UD may include measuring the average of the first user distance UD1, the second user distance UD2, and the third user distance UD3.

When there is a plurality of users, step S100 of measuring the user distance UD may include measuring the median of the distances between the display panel 100 and the users. For example, since the median of the distances between the display panel and the users is the second user distance UD2, operation S100 of measuring the user distance UD may include measuring the second user distance UD2.

Referring back to FIGS. 1 to 3A and 9, the displaying method of the display device 10 according to an embodiment may further include setting the reference distance SD corresponding to the first radius of curvature R1 (in FIGS. 5 and 6). The reference distance SD may be a distance between the display panel 100 and the user USER when the user USER recognizes an image, for example.

The displaying method of the display device 10 according to an embodiment includes the curvature radius change operation S200 of receiving the distance data UDD measured in operation S100 of measuring the distance UD to change the first radius of curvature R1 (in FIGS. 5 and 6) of the display panel 100 to the second radius of curvature R2 (in FIGS. 5 and 6) different from the first radius of curvature R1 (in FIGS. 5 and 6). The radius of curvature may change by the curvature radius changing unit 300, for example.

Referring to FIGS. 5 and 9, when the user distance UD is shorter than the reference distance SD, the radius of curvature of the display panel 100 changes from the first radius of curvature R1 to the second radius of curvature R2 smaller than the first radius of curvature R1 in curvature radius change operation S200 in order to enable the user USER to experience enhancement in 3D effect, absorption and presence. When the display panel 100 is seen from the reference distance SD, the display panel 100 may become more concave as the user distance UD is shorter than the reference distance SD.

Referring to FIGS. 6 and 9, when the user distance UD is shorter than the reference distance SD, the radius of curvature of the display panel 100 changes from the first radius of curvature R1 to the second radius of curvature R2 larger than the first radius of curvature R1 in curvature radius change operation S200 in order to enable the user USER to experience enhancement in 3D effect, absorption and presence. When the display panel 100 is seen from the reference distance SD, the display panel 100 may become more convex as the user distance UD is longer than the reference distance SD.

In a displaying method of a typical display device, it has been difficult to change a radius of curvature according to the location of a user. Thus, there was a limitation in that a user recognizing an image has experienced a decrease in 3D effect, absorption and presence according to the location of the user.

In contrast, the displaying method of the display device according to an embodiment may change the radius of curvature of the display panel according to the location of a user. Therefore, the user recognizing an image may experience enhancement in 3D effect, absorption and presence according to the location of the user. Accordingly, the display device according to an embodiment may have enhanced display quality.

By way of summation and review, a display device having a curved shape may vary in 3D effect, absorption, and presence in accordance with the movement, e.g., location, of a user relative to the screen. In contrast, according to embodiments, a curved display device may maintain 3D effect, absorption, and presence, regardless of the position of the user relative to the screen, thereby enhancing the display quality of the display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a display panel displaying an image and having a changeable curvature, the curvature of the display panel being changeable between a first radius of curvature and a second radius of curvature that is different from the first radius of curvature; and
   a distance measuring unit measuring a user distance, the user distance being a distance between the display panel and a user;
   wherein the curvature of the display panel is changeable in proportion to the measured user distance from the distance measuring unit,
   wherein, when there is a plurality of users, the user distance is an average of distances between the display panel and each of the plurality of users, or the user distance is a median of distances between the display panel and each of the plurality of users, and
   wherein a pattern of the image does not change based on the user distance.

2. The display device as claimed in claim 1, wherein, when the measured user distance is shorter than a reference distance, the display panel has the second radius of curvature and the second radius of curvature is smaller than the first radius of curvature.

3. The display device as claimed in claim 2, wherein, when the measured user distance is longer than the reference distance, the display panel has the second radius of curvature and the second radius of curvature is larger than the first radius of curvature.

4. The display device as claimed in claim 1, further comprising:
   a remote controller remotely adjusting the display panel; and
   an adjustment signal receiving unit receiving an adjustment signal from the remote controller.

5. The display device as claimed in claim 4, wherein the distance measuring unit includes the adjustment signal receiving unit.

6. The display device as claimed in claim 1, wherein the distance measuring unit includes at least one of a camera, an infrared sensor, an ultraviolet sensor, and a laser sensor.

7. The display device as claimed in claim 1, wherein the display panel is further changeable to a third radius of curvature different from the first radius of curvature.

8. A displaying method of a display device, the displaying method comprising:
- measuring a user distance between a display panel having a first radius of curvature and a user;
- receiving the measured user distance data; and
- changing the first radius of curvature of the display panel to a second radius of curvature different from the first radius of curvature based on the received distance data,
- wherein, when there is a plurality of users, measuring the user distance includes measuring an average of distances between the display panel and the plurality of users, or measuring the user distance includes measuring a median of distances between the display panel and the plurality of users, and
- wherein a pattern of an image the display panel displays, does not change based on the user distance.

9. The displaying method as claimed in claim 8, further comprising setting a reference distance corresponding to the first radius of curvature.

10. The displaying method as claimed in claim 9, wherein changing the first radius of curvature includes setting the second radius of curvature to be smaller than the first radius of curvature when the user distance is shorter than the reference distance.

11. The displaying method as claimed in claim 10, wherein changing the first radius of curvature includes setting the second radius of curvature to be larger than the first radius of curvature when the user distance is longer than the reference distance.

12. The displaying method as claimed in claim 8, wherein measuring the user distance includes measuring a shortest distance from a point on the distance measuring unit to a point between a left eye of the user and a right eye of the user.

13. The displaying method as claimed in claim 8, wherein, when there is a plurality of users, measuring the user distance includes measuring a distance between a user closest to the display panel among the plurality of users and the display panel.

14. A display device, comprising:
- a display panel including a first display part displaying a first image in a first direction and a second display part displaying a second image in a second direction which is opposite to the first direction, wherein the first display part has a first radius of curvature and the second display part has a second radius of curvature; and
- a distance measurer measuring a first user distance and a second user distance different from the first user distance, the first user distance being a distance between the first display part and a first user apart from the first display part in the first direction, the second user distance being a distance between the second display part and a second user apart from the second display part in the second direction;
- wherein the curvature of the first display part is changeable from the first radius of curvature to a third radius of curvature different from the first radius of curvature in proportion to the measured first user distance from the distance measurer, wherein the curvature of the second display part is changeable from the second radius of curvature to a fourth radius of curvature different from both the second radius of curvature and the third radius of curvature in proportion to the measured second user distance from the distance measurer;
- wherein the first display part has a concave shape in the first direction and the second display part has a concave shape in the second direction.

* * * * *